(12) United States Patent
Kawashima et al.

(10) Patent No.: US 6,214,218 B1
(45) Date of Patent: Apr. 10, 2001

(54) SOLDERING APPARATUS AND AGENT FOR SEPARATING SOLDER AND SOLDER OXIDES

(75) Inventors: Yasuji Kawashima, Ibaraki; Kaoru Shimizu, Osaka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/253,527

(22) Filed: Feb. 22, 1999

(30) Foreign Application Priority Data

| Feb. 27, 1998 | (JP) | 10-046943 |
| Feb. 27, 1998 | (JP) | 10/046944 |
| Oct. 22, 1998 | (JP) | 10-300546 |
| Dec. 17, 1998 | (JP) | 10-358947 |

(51) Int. Cl.[7] ................................................. B23K 1/08
(52) U.S. Cl. ............................ 210/179; 134/93; 228/56.2
(58) Field of Search ............................. 210/175, 179, 210/205; 134/93, 105; 228/34, 56.2

(56) References Cited

U.S. PATENT DOCUMENTS

| 4,007,119 | * | 2/1977 | Antonevich | 210/523 |
| 4,339,784 | | 7/1982 | Shearer | |
| 4,951,597 | * | 8/1990 | Kataoka | 118/58 |
| 5,087,356 | * | 2/1992 | Webb | 210/143 |
| 5,568,894 | * | 10/1996 | Gileta | 228/219 |

FOREIGN PATENT DOCUMENTS

| 0 499 134 | 8/1992 | (EP) . |
| 0 640 424 | 3/1995 | (EP) . |
| 62-179867 | 8/1987 | (JP) . |
| 63-281770 | 11/1988 | (JP) . |
| 02089569 | 3/1990 | (JP) . |
| 2573366 | 4/1991 | (JP) . |
| 4-319091 | 11/1992 | (JP) . |
| 05063349 | 3/1993 | (JP) . |
| 06198426 | 7/1994 | (JP) . |
| 7-51841 | 2/1995 | (JP) . |
| 10163617 | 6/1998 | (JP) . |

OTHER PUBLICATIONS

Liedke, Volker, "Wellenlöten ohne Flussmittel", F&M Feinwerktechnk & Messtechnik, vol. 101, no. 7/8, Aug. 1993, pp. 308–312.

Hasegawa, Kiketsu, "Stabilizing Mechanism for Peel–Back Point of One–Sided Flow Soldering Tub", J.E.E. Journal of Electronic Engineering, vol. 24, no. 242, Feb. 1987, pp. 59–60.

* cited by examiner

Primary Examiner—David A. Simmons
Assistant Examiner—Frank M. Lawrence
(74) Attorney, Agent, or Firm—Wenderoth, Lind & Ponack, L.L.P.

(57) ABSTRACT

A soldering apparatus includes a solder wave shape forming device for melting solder and forming a solder wave shape, and a separating agent dusting device for dusting solder oxides with a separating agent which separates solder and solder oxides. The separating agent is any one selected from the group consisting of offal, cereal grain or flour, bean flour, seed grain or flour, soybean-cake flour, and peanut hull flour, or a combination thereof, as well as an agent and a method of separating solder and solder oxides.

36 Claims, 7 Drawing Sheets

1 solder outflowing nozzle
2 front baffle plate
3 rear baffle plate
4 perforated plate
12 pore
13 delivery pump
14 axis
15 duct
16 opening
21 solder outflowing device

Fig. 7

(1) 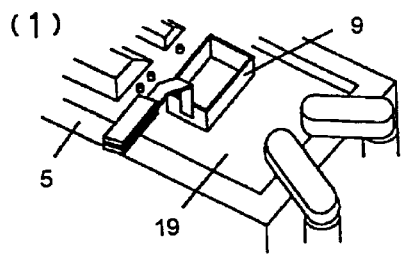

A receiving vessel is sunk in a vacant space of a solder bath.

(2) 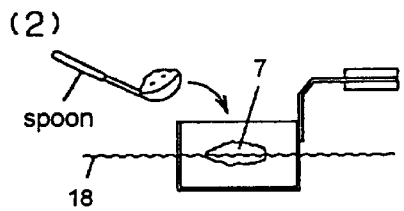

The vessel is sunk by around half and solder dross is placed therein with a spoon and the like.

(3) 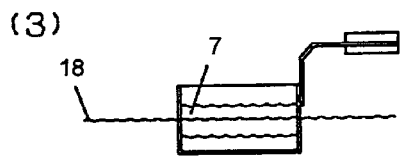

An amount of solder dross is suitably about half of the volume of the vessel.

(4) 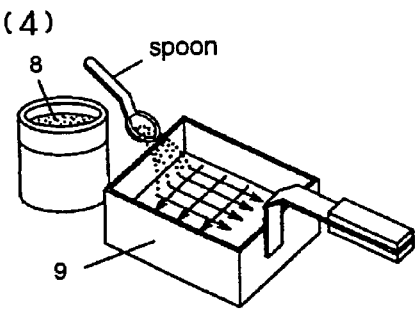

An separating agent is scattered uniformly onto the solder dross surface with a spoon.

9 vessel
5 solder bath
7 solder oxides with solder adhered thereto (solder dross)
18 molten solder surface
8 separating agent (rice bran etc.)
17 solder oxides (oxidized draff)
19 molten solder (5) up and down movement
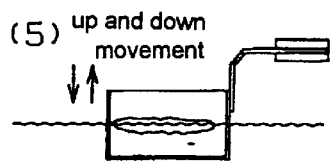

The receiving vessel is moved up and down from the molten solder surface several times so that solder dross is shaken.

(6) 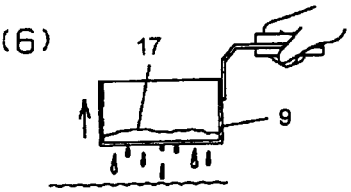

When only solder oxides remain, the receiving vessel is lifted to sufficiently flow off pure solder through an underside.

(7) 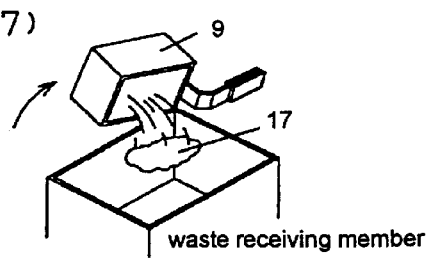

The oxidized draff is discarded into a waste receiving member etc.

SOLDERING APPARATUS AND AGENT FOR SEPARATING SOLDER AND SOLDER OXIDES

FIELD OF THE INVENTION

The present invention relates to an automated soldering apparatus and a solder recovering apparatus for use in the printed wiring board and the like. In particular, it relates to a soldering apparatus and a solder recovering apparatus which separate solder oxides with solder adhered thereto into solder and solder oxides so as to recover them.

The present invention also relates to a method of separating solder oxides with solder adhered thereto into solder and solder oxides and a method of separating solder oxides in contact with molten solder into solder and solder oxides. The present invention also relates to a method of removing solder oxides from solder oxides floating on molten solder.

The present invention also relates to a separating agent which can separate solder oxides from solder oxides with solder adhered thereto or solder oxides in contact with molten solder. The present invention further relates to a vessel for receiving solder oxides with solder adhered thereto or solder oxides in contact with molten solder.

BACKGROUND OF THE INVENTION

A large amount of solder oxides are formed when electronic parts are soldered on the printed wiring board using a dip-type soldering apparatus or a flow-type soldering apparatus. Moreover, when the solder oxides are scooped up from molten solder or drained from a solder bath to solidify, a large amount of solder is observed to be adhered to the solder oxides.

The solder oxides with solder adhered thereto are sold to the regenerators at a low price. In order to prevent oxidation of solder, an anti-oxidizing agent such as heat-resistant mineral oil has been added to the surface of molten solder, or a solder bath and its surroundings have been enclosed with an inert gas such as nitrogen gas so that the oxygen concentration is reduced to minimize oxidation of solder.

On the other hand, a powdery product obtained by adding a potassium salt to ammonium borohydrochloride is commercially available as a separating/reducing agent for solder oxides, which can separate solder from solder oxides with solder adhered thereto to remove only solder oxides (tradename/KLEENOX OR-904P/sold by ELECTROVERT).

In addition, for example, JP-A-5-63349 and the like proposed a wave solder bath equipped with a means for flowing solder oxides from the solder bath together with a heat-resistant fat and oil.

However, the previous selling of the solder oxides to the regenerators has a great loss of solder because a large amount of expensive solder is adhered to solder oxides.

The addition of the anti-oxidizing agent to the surface of molten solder makes the solder bath stickily smeary with the anti-oxidizing oil and the like, which leads to not only troublesome cleaning but also adherence to the printed wiring board and the like.

The solder bath disclosed in JP-A-5-63349 also has a similar problem in that the heat-resistant fat and oil is accumulated in a solder reservoir, or a duct for solder is clogged with the fat and oil.

The use of the inert gas results in a higher cost and requires larger and more complicated facilities.

The powdery separating agent containing ammonium borohydrochloride as a main component is expensive at about 6,000 yen/450 g and, upon handling, requires safety management such as paying attention so as not to make the agent touch the skin, wearing eyeglasses for protecting eyes, and the like.

SUMMARY OF THE INVENTION

A main object of the-present invention is to provide a soldering apparatus and a solder recovering apparatus which can prevent a soldering apparatus from being smeared with an anti-oxidizing agent such as a heat-resistant fat and oil, which is safe and non-polluting, and which can easily remove solder oxides floating on molten solder.

Another object of the present invention is to provide a method for removing solder oxides which can prevent a soldering apparatus from being smeared with an anti-oxidizing agent such as a heat-resistant fat and oil, which is safe and non-polluting, and which can easily remove solder oxides floating on molten solder.

Another object of the present invention is to provide a separating agent which can easily separate and remove only solder oxides when solder oxides with solder adhered thereto are immersed into molten solder, and a solder recovering apparatus such the separating agent.

Another object of the present invention is to provide a separating agent which can easily separate solder oxides from solder oxides with solder adhered thereto or from solder oxides in contact with molten solder.

A further object of the present invention is to provide a vessel for receiving solder oxides with solder adhered thereto or solder oxides in contact with molten solder.

In order to solve the aforementioned problems, the present invention features a soldering apparatus comprising a solder wave shape forming means for melting solder and forming a solder wave shape, and a separating agent dusting means for dusting solder oxide with a separating agent for separating solder and solder oxides. The separating agent is a vegetable member, and more particularly, any one selected from the group consisting of offal, cereal grain or flour, bean flour, seed grain or flour, soybean-cake flour and peanut hull flour, or a combination thereof.

The present invention features the aforementioned soldering apparatus, wherein the vegetable separating agent for separating solder and solder oxides is any one selected from the group consisting of offal (such as rice bran, bran, wheat bran, mixed barley bran, naked barley bran, mixed naked barley bran and the like), cereal grain or flour (such as foxtail, Deccan grass, millet and rice), bean flour (such as soybean, azuki bean, peanut, coconut and the like), and seed grain or flour (such as sesame, sunflower, palm, rapeseed, cotton and the like), or a combination thereof.

For example, the vegetable separating agent may a separating agent obtained by mixing rice bran and sesame flour in a ratio by weight ranging between 100:20 and 100:5. By mixing sesame flour into offal, the duration of separating action is prolonged.

Of course, other combinations and a mixture of two or more separating agents may be arbitrarily used.

In addition, the present invention features a method of separating solder oxides from molten solder, which comprises a step of scooping up solder oxides floating on molten solder (at around 280–290° C.) into a vessel, a step of dusting the solder oxides with any one of the above separating agents (such as rice bran) or a combination thereof, a step of pulling out the vessel from a solder bath to separate solder and solder oxides, and a step of discharging separated solder oxides (oxidized draft).

In addition, the present inventions features another method of separating solder oxides, which comprises a step of dusting solder oxides floating on molten solder with any one of the above separating agents (such as foxtail grain) or a combination thereof, a step of scooping up solder oxides floating on molten solder into a vessel, a step of pulling out said vessel from a solder bath to separate solder and solder oxides, and a step of discharging separated solder oxides.

In addition, the present invention features a vessel (which is used in the aforementioned soldering apparatus or method) for scooping up solder oxides floating on molten solder. The vessel comprises a netted basket having a mesh opening (through-hole) area of around 1–10 mm², desirably around 1–2.25 mm², or a press-worked punching metal. The metal may have a plurality of openings on an underside and on each sidewall, and each of openings has an opening area of around 1–2.25 mm².

A range setting of the opening area of 1–10 mm² in the netted basket or the punching metal was determined by an experiment such that solder separated from solder oxides is smoothly returned to a molten solder bath and oxidized draff (solder oxides) remains within the vessel. The constituent members of the netted basket or the punching metal is made of a material such as stainless steel and the like, to which no solder is adhered.

The netted basket is formed so that a diameter of constituent wires of the net is approximately 0.3–0.7 mm and a side of a rectangular opening is approximately 1.0–3 mm. Preferably, the diameter of the constituent wires of the net is approximately 0.5 mm, and a side of the rectangular opening is approximately 1.2 mm.

The mechanism of each of the above separating agents for separating solder oxides from solder adhered thereto or solder oxides in contact with (or floating on) molten solder into solder and solder oxides can be considered as follows. An oil component which constitutes the separating agent (organic acid $R\text{-}(COOH)_n$ component contained in the oil (that is, oleic acid, linolic acid, palmitic acid and the like)) exerts the reducing effects on metal oxides as exemplified by the following equation:

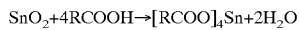
$$SnO_2 + 4RCOOH \rightarrow [RCOO]_4Sn + 2H_2O$$

In addition, phosphorus (P) and the fats and oils contained in the separating agent are considered to exert the function of preventing solder oxidation.

Moreover, fiber, hydrocarbon and the like which constitute the separating agent are considered to associate with solder oxides (dross) to inhibit association of solder oxides with molten solder.

It is considered that a component which is converted to carbon (C) by heating with molten solder reacts as represented by the following equation:

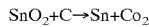
$$SnO_2 + C \rightarrow Sn + Co_2$$

Carbon acts as a reducing agent.

Moreover, when sodium (Na) is contained in the separating agent, it also acts as a reducing agent.

Particle size distribution of each powdery separating agent is not necessarily required to be regulated. Particle size distribution resulted from a step of polishing unpolished rice or producing wheat flour may be used as such (a range of about 0.01 µm–1 mm).

Incidentally, the components of rice bran (one example of a bran), are exemplified as follows: not more than 2% of phosphorus (P), 13.4% of protein, 17.1% of crude fat, 7.9% of crude fiber, 10.2% of crude ash content, 0.06% of calcium (Ca), and major remaining portion of digestible components (poultry, swine, bovine and the like) (other components are omitted). Rice bran comprises triturates such as those of fruit skin, seed coat and germ, which are obtained upon polishing hulled rice and the like.

Commercially available rice bran for pickles has a slight amount of salt, sea tangle, red pepper and the like added, and the rice bran exhibits the efficacy as a separating agent equivalent to that of rice bran itself.

In addition, a determined amount of an antiseptic (such as benzoic acid compound) and an insect repellent may be mixed into rice bran. Alternatively, rice bran may be antisepsis-or insect proof-treated.

Next, of cereals, foxtail, millet and Deccan grass grains have the following components:

Foxtail has 7.0 g of fat, 240 mg of phosphorus (P), 7 mg of sodium (Na), 21 mg of calcium (Ca), 5 mg of iron, and 9.9 g of protein (other components are omitted) in 100 g of an edible portion.

Millet has 9.1 g of fat, 270 mg of phosphorus (p), an extremely small amount of sodium (Na), 20 mg of calcium (Ca), 3.5 mg of iron, and 12.7 g of protein (other components are omitted) in 100 g of an edible portion.

Deccan grass has 8.3 g of fat, 330 mg of phosphorus (P), an extremely small amount of sodium (Na), 33 mg of calcium (Ca), 3.5 mg of iron, and 9.3 g of protein (other components are omitted) in 100 g of an edible portion.

Next, of beans, soybean has the following components: 17.5 g of fat, 470 mg of phosphorus (P), 3 mg of sodium (Na), 190 mg of calcium (Ca), 7 mg of iron, and 34.3 g of protein (other components are omitted) in 100 g of an edible portion (see "Kagakubinran" Applicant Section, edited by Nihon Kagaku Gakkai, 1973, pp. 1366–1367, 14041405/ published by Maruzen K. K.).

Therefore, the above respective separating agents other than rice bran also contain an oil component and phosphorus, or an oil component. Thus, like rice bran, these agents separate solder oxides in contact with molten solder or solder oxides with solder adhered thereto into solder and solder oxides.

In particular, bean flour (soybean, azuki bean, peanut, coconut and the like) and seed grain or flour (sesame, sunflower, palm, rapeseed and the like), which are rich in oil and fat components, are effective. Fatty acid in sesame contains a large amount of oleic acid and linolic acid.

Next, of cereals, foxtail grain is odorless and is easily fed at a constant quantity. Foxtail grain is generally spherical or popcorn-shaped and has approximately 1–2 mm of an outer diameter and approximately 1–2 mm of length, which can be used as such. Particle size regulation and grinding process may be carried out as necessary. Upon separation of solder oxides, foxtail grain may be fed in an amount equivalent to that of rice bran.

In addition, the separating agent of the present invention may contain one member or a combination of two or more members as mentioned above.

In addition, the present invention features a separating agent for separating solder oxides from solder adhered thereto or solder oxides in contact with molten solder into solder and solder oxides. The agent comprises any one selected from the group consisting of offal (such as rice bran, bran, wheat bran, mixed barley bran, naked barley bran, mixed naked barley bran and the like), bean flour (such as soybean, azuki bean, peanut, coconut and the like), soybean-cake flour, peanut hull flour, and seed flour (such as sesame, sunflower, palm, rapeseed, cotton and the like), or a combination thereof In addition, the present invention features a method of separating solder oxides with solder adhered thereto into solder and solder oxides. The method comprises a step of placing solder oxides with solder adhered thereto into a vessel, a step of immersing the vessel into a molten solder bath (around 280° C.–290° C.) to melt the solder oxides with solder adhered thereto, a step of dusting the solder oxides with solder adhered thereto with any one of the above separating agents (for example, rice bran) or a combination thereof, and a step of pulling the vessel out from the molten solder bath to separate solder and solder oxides.

In addition, the present invention features the aforementioned method of separating solder oxides with solder adhered thereto into solder and solder oxides, further comprising a step of pulling the vessel out from and immersing it into the solder bath, or moving the vessel up and down multiple times after dusting with the separating agent, as necessary.

In addition, the present invention features another method for separating solder oxides with solder adhered thereto into solder and solder oxides. The method comprises a step of placing solder oxides with solder adhered thereto into a vessel, a step of dusting the solder oxides with solder adhered thereto with any one of the above separating agents (for example, rice bran) or a combination thereof, a step of immersing the vessel into a molten solder bath to melt the solder oxides with solder adhered thereto, and a step of pulling out the vessel from the solder bath to separate solder and solder oxides.

In addition, the present invention features an another method of separating solder oxides with solder adhered thereto into solder and solder oxides, which comprises a step of immersing a vessel into a molten solder bath by about half, a step of placing solder oxides with solder adhered thereto into the vessel, a step of dusting the solder oxides with solder adhered thereto with any one of the above separating agents (for example, rice bran) or a combination thereof, and a step of pulling the vessel out from the solder bath after melting solder oxides with solder adhered thereto, to separate solder and solder oxides.

In addition, the present invention features a method of separating solder oxides in contact with molten solder into solder and solder oxides, which comprises a step of scooping up solder oxides floating on molten solder into a vessel, a step of dusting the solder oxides with any one of the above separating agents (for example, rice bran) or a combination thereof, and pulling out the vessel from the solder bath to separate solder and solder oxides.

In addition, the present invention features an another method of separating solder oxides in contact with molten solder into solder and solder oxides, which comprises a step of dusting solder oxides floating on molten solder with any one of the above separating agents (for example, rice bran) or a combination thereof, a step of scooping up solder oxides floating on molten solder into a vessel, and pulling out the vessel from the solder bath to separate solder and solder oxides.

Further, the present invention features a vessel for receiving solder oxides with solder adhered thereto or solder oxides in contact with molten solder, comprising a netted basket having a mesh opening (through hole) area of around 1–10 mm$^2$, desirably around 1–2.25 mm$^2$, or a press-worked punching metal having a plurality of openings on an underside and on each sidewall, each of the openings having an opening area of around 1–2.25 mm$^2$.

The constituent members of the netted basket or the punching metal are made of a material such as stainless steel and the like, to which no solder is adhered.

The netted basket is formed so that the diameter of the constituent wires of the net is approximately 0.3–0.7 mm and a side of a rectangular opening is approximately 1.0–3 mm. Preferably, the diameter of constituent wires of the net is approximately 0.5 mm and a side of the rectangular opening is approximately 1.2 mm.

Pursuant to the aforementioned essential features, there can be provided a separating agent for separating solder and solder oxides, a soldering apparatus (or a solder recovering apparatus) and a method for separating solder and solder oxides, which are safe to work with at a low cost, harmless to the human body and non-polluting. Moreover, according to the present invention, separating solder oxides can be easily automated and the amount of solder to be discarded while adhering to solder oxides can be reduced. As the result, since the utilization rate, recovery rate and the like of solder can be enhanced, it serves useful for protection of the earth environment.

BRIEF DESCRIPTION OF THE DRAWINGS

FIG. 7 is a view schematically showing each step of a method for separating solder and solder oxides.

DETAILED DESCRIPTION OF THE INVENTION

Figure 1:
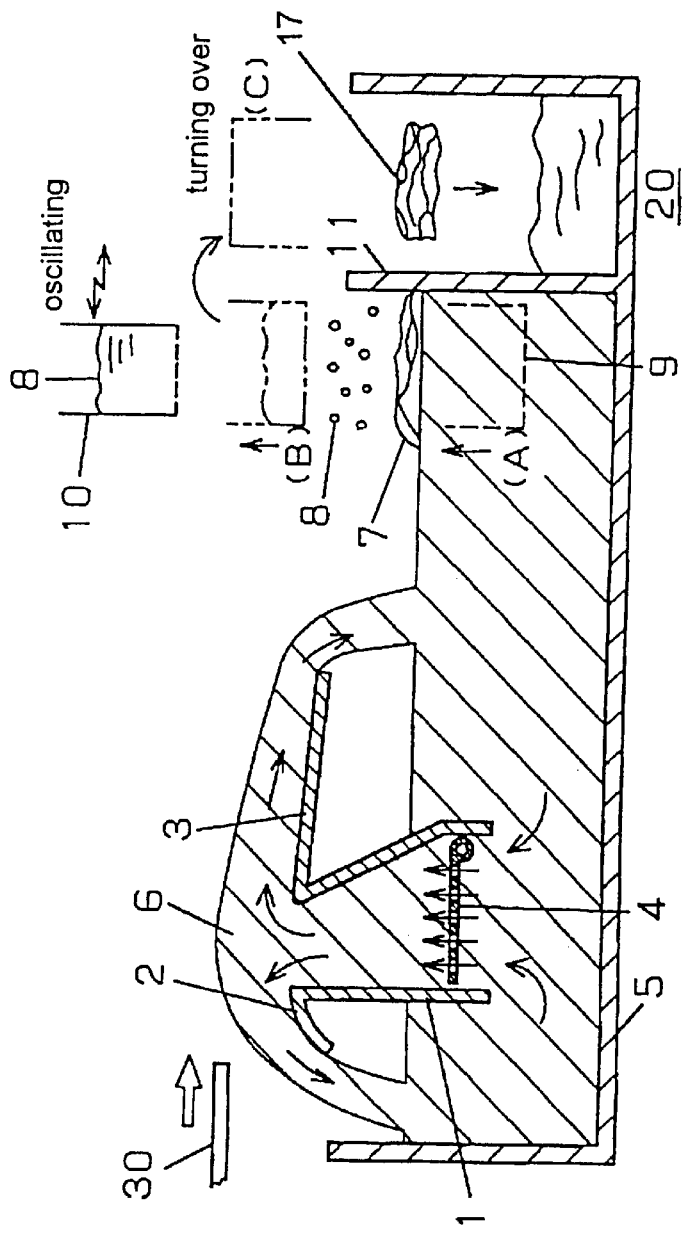
FIG. 1 is a sectional view of a main part of a soldering apparatus as one embodiment of the present invention.

The first embodiment of the present invention provides a soldering apparatus comprising a solder wave shape forming means for melting solder and forming a solder wave shape, and a means for dusting solder oxides with a separating agent for separating solder and solder oxides. The separating agent is any one selected from the group consisting of offal, cereal grain or flour, bean flour, seed grain or flour, soybean-cake flour and peanut hull flour, or a combination thereof This soldering apparatus is harmless and non-polluting, and can extremely easily separate solder and solder oxides. Moreover, since utilization rate, recovery rate and the like of solder can be enhanced, it is useful for protection of the earth environment.

The second embodiment of the present invention provides the soldering apparatus according to the first embodiment, wherein the offal is any one selected from the group consisting of rice bran, bran, wheat bran, mixed barley bran, naked barley bran, and mixed naked barley bran, or a combination thereof. The cereal is any one selected from the group consisting of foxtail, millet, Deccan grass and rice, or a combination thereof The bean is any one selected from the group consisting of soybean, azuki bean, peanut and coconut, or a combination thereof. Finally, the seed is any one selected from the group consisting of sesame, sunflower, palm and rapeseed, or a combination thereof. According to this soldering apparatus, solder and solder oxides can be separated at an extremely low cost. In addition, wastes can be effectively utilized.

In addition, the third embodiment of the present invention provides the soldering apparatus according to the first embodiment, further comprising a means for scooping up solder oxides. According to this soldering apparatus, the removal of solder oxides can be automated and the soldering work on the printed wiring board can be continuously performed.

In addition, the fourth embodiment of the present invention provides the soldering apparatus according to the third embodiment, further comprising a discharging means for discharging scooped solder oxides from the vessel. According to this soldering apparatus, the removal of solder oxides can be automated and the soldering work on the printed wiring board can be continuously performed.

In addition, the fifth embodiment of the present invention provides a method of separating solder oxides, which comprises a step of scooping up solder oxides floating on molten solder into a vessel, a step of dusting with any one of the separating agents in accordance with either the first or second embodiment, or a combination thereof, a step of pulling the vessel out from a solder bath to separate solder and solder oxides, and a step of discharging separated solder oxides (oxidized draff). According to this method, the removal of solder oxides can be automated and the soldering work on the printed wiring board can be continuously performed. In addition, an amount of solder to be discarded while adhering to solder oxides can be reduced. As a result, since utilization rate, recovery rate and the like of solder can be enhanced, it is useful for protection of the earth environment.

In addition, the sixth embodiment of the present invention provides a method for separating solder and solder oxides, which comprises a step of dusting solder oxides floating on molten solder with any one of the separating agents in accordance with the first or second embodiment, or a combination thereof, a step of scooping up the solder oxides floating on molten solder into a vessel, a step of pulling out the vessel from a solder bath to separate solder and solder oxides, and a step of discharging separated solder oxides (oxidized draff). According to this method, the removal of solder oxides can be automated and the soldering work on the printed wiring board can be continuously performed. In addition, an amount of solder to be discarded while adhering to solder oxides can be reduced. As a result, since utilization rate, recovery rate and the like of solder can be enhanced, it is useful for protection of the earth environment.

In addition, the seventh embodiment of the present invention provides the soldering apparatus according to the first embodiment, further comprising a solder oxide scraping means for scraping out solder oxides separated from molten solder in a solder bath. This soldering apparatus is harmless and non-polluting, and can extremely easily separate solder and solder oxides. Moreover, since utilization rate, recovery rate and the like of solder can be enhanced, it is useful for protection of the earth environment.

In addition, the eighth embodiment of the present invention provides the soldering apparatus according to the first embodiment, further comprising a solder oxides forcing means for forcing solder oxides separated from molten solder to flow with an inert gas. This soldering apparatus can extremely easily separate solder and solder oxides. In addition; since utilization rate, recovery rate and the like of solder can be enhanced, it is useful for protection of the earth environment.

In addition, the ninth embodiment of the present invention provides a separating agent for separating solder oxides with solder adhered thereto or solder oxides in contact with molten solder into solder and solder oxides. The separating agent comprises any one selected from the group consisting of offal (rice bran, bran, wheat bran, mixed barley bran, naked barley bran, mixed naked barley bran and the like), bean flour (soybean, azuki bean, peanut, coconut and the like), soybean-cake flour, peanut hull flour, and seed flour (sesame, sunflower, palm, rapeseed and the like), or a combination thereof. This embodiment can provide a separating agent which is harmless to a human living body, non-polluting and extremely low cost. Moreover, since utilization rate, recovery rate and the like of solder can be enhanced, it is useful for protection of the earth environment.

In addition, the tenth embodiment of the present invention provides a method of separating solder oxides with solder adhered thereto into solder and solder oxides. The method comprises a step of placing solder oxides with solder adhered thereto into a vessel, a step of immersing the vessel into a molten solder bath to melt the solder oxides with solder adhered thereto, a step of dusting with any one of the separating agents in accordance with the ninth embodiment or a combination thereof, and a step of pulling the vessel out from the solder bath to separate solder and solder oxides. According to this embodiment, the solder oxides separating work can be simply and easily performed, and an amount of solder to be discarded while adhering to solder oxides can be reduced. As a result, since utilization rate, recovery rate and the like of solder can be enhanced, it is useful for protection of the earth environment.

In addition, the eleventh embodiment of the present invention provides a method of separating solder oxides with solder adhered thereto into solder and solder oxides. The method comprises a step of placing solder oxides with solder adhered thereto into a vessel, a step of dusting the solder oxides with solder adhered thereto with any one of the separating agents in accordance with the ninth embodiment or a combination thereof, a step of immersing the vessel into a molten solder bath to melt the solder oxides with solder adhered thereto, and a step of pulling out the vessel from the solder bath to separate solder and solder oxides. According to this embodiment, the solder oxides separating work can be simply and easily performed, and an amount of solder to be discarded while adhering to solder oxides can be reduced. As a result, since utilization rate, recovery rate and the like of solder can be enhanced, it is useful for protection of the earth environment.

In addition, the twelfth embodiment of the present invention provides a method of separating solder oxides with solder adhered thereto into solder and solder oxides. The method comprises a step of immersing a vessel into a molten solder bath by around half, a step of placing solder oxides with solder adhered thereto into the vessel, a step of dusting the solder oxides with solder adhered thereto with any one of the separating agents in accordance with the ninth embodiment or a combination thereof, and a step of, after melting of solder which has been adhered to solder oxides, pulling out said vessel from the solder bath to separate solder and solder oxides. According to this embodiment, the solder oxides separating work can be simply and easily performed and an amount of solder to be discarded while adhering to solder oxides can be reduced. As a result, since utilization rate, recovery rate and the like of solder can be enhanced, it is useful for protection of the earth environment.

In addition, the thirteenth embodiment of the present invention provides a method of separating solder oxides in contact with molten solder into solder and solder oxides. This method comprises a step of scooping up solder oxides floating on molten solder into a vessel, a step of dusting with any one of the separating agents in accordance with the ninth embodiment or a combination thereof, and a step of pulling out the vessel from the solder bath to separate solder and solder oxides. According to this embodiment, the solder oxides separating work can be simply and easily performed and an amount of solder to be discarded while adhering to solder oxides can be reduced. As a result, since utilization rate, recovery rate and the like of solder can be enhanced, it is useful for protection of the earth environment.

In addition, the fourteenth embodiment of the present invention provides a method of separating solder oxides in contact with molten solder into solder and solder oxides. This method comprises a step of dusting solder oxides floating on molten solder with any one of the separating agents in accordance with the ninth embodiment or a combination thereof, a step of scooping up the solder oxides floating on molten solder into a vessel, and a step of pulling out the vessel from the solder bath to separate solder and solder oxides. According to this embodiment, the solder oxides separating work can be simply and easily performed and an amount of solder to be discarded while adhering to solder oxides can be reduced. As a result, utilization rate, recovery rate and the like of solder can be enhanced, it is useful for protection of the earth environment.

In addition, the fifteenth embodiment of the present invention provides a vessel for receiving solder oxides with solder adhered thereto or solder oxides in contact with molten solder. The vessel comprises a plurality of openings on an underside and on each sidewall, each of the openings having an opening area of around 1–2.25 mm². This vessel can easily and effectively separate solder and solder oxides.

In addition, the sixteenth embodiment of the present invention provides a vessel for receiving solder oxides with solder adhered thereto or solder oxides in contact with molten solder. The vessel comprises a netted basket having a diameter of constituent wires of the net of 0.3–0.7 mm, and a side of a rectangular opening of 1.0–1.5 mm. The vessel preferably has a diameter of constituent wires of the net of approximately 0.5 mm, and a side of a rectangular opening of approximately 1.2 mm. This vessel can easily and effectively separate solder and solder oxides.

EXAMPLES

Figure 2:
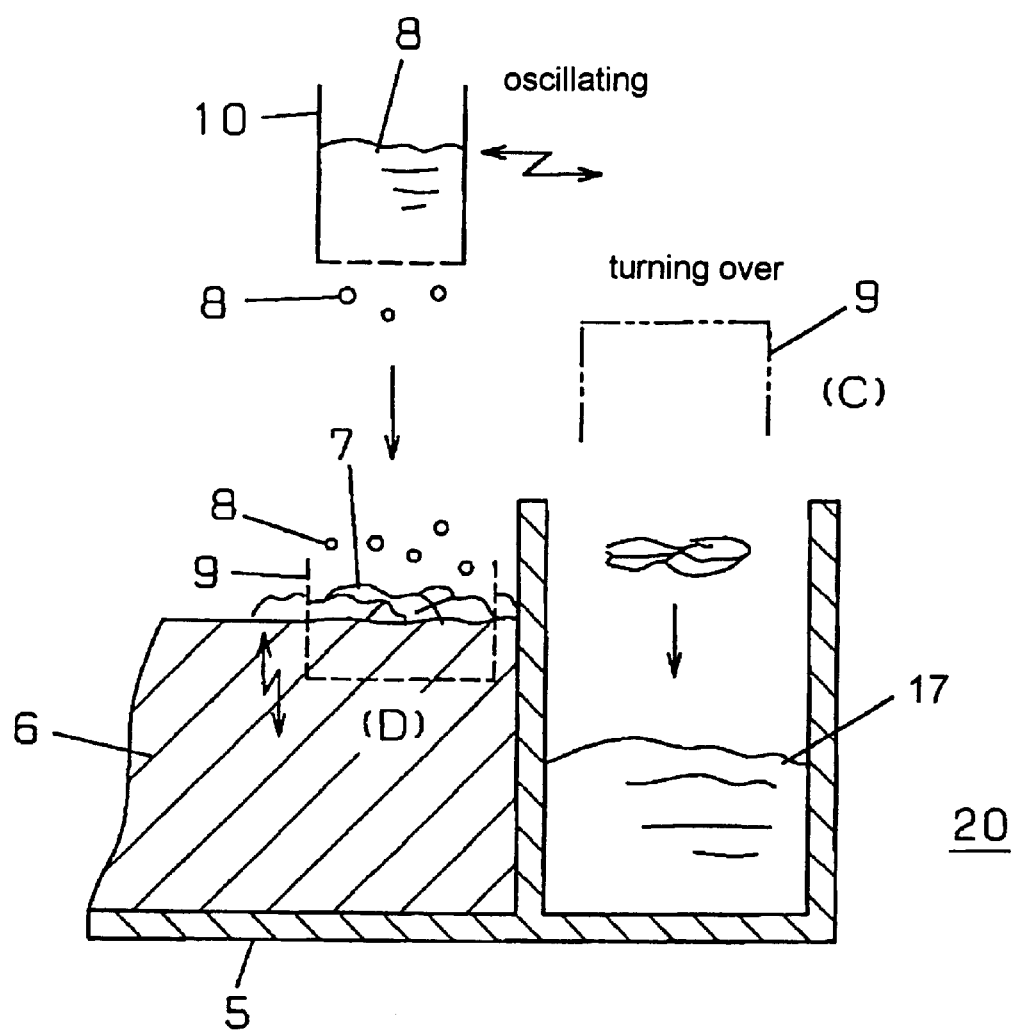
FIG. 2 is a view illustrating a method for removing solder oxides using a soldering apparatus, a sectional view of a main part of which is shown in FIG. 1.
Figure 3:
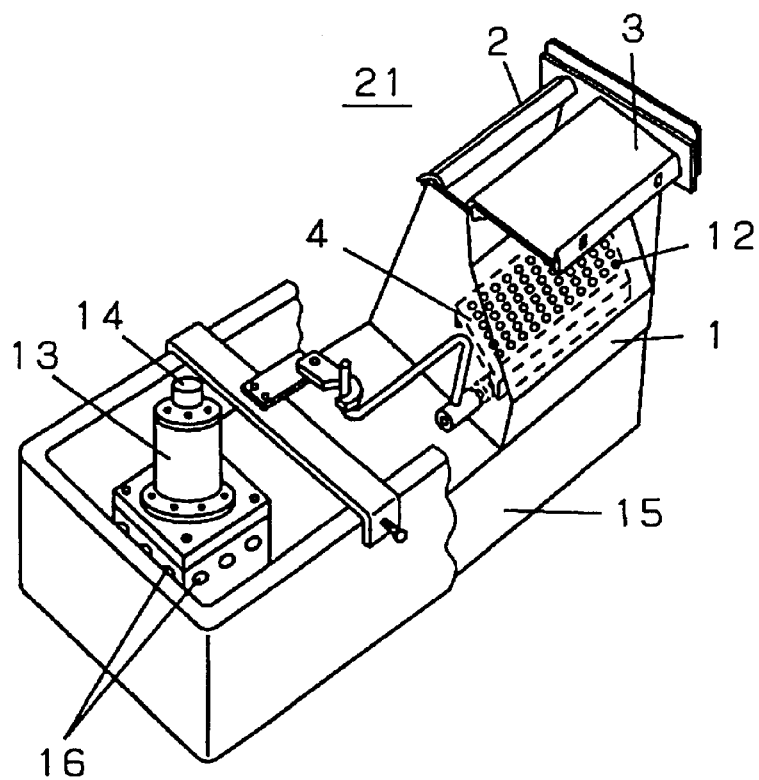
FIG. 3 is a perspective view of a main part of a solder outflowing device which is one component of the soldering apparatus of FIG. 1.

The following Examples illustrate the present invention in detail but are not to be construed to limit the scope thereof FIG. 1 is a sectional view of a main part of a soldering apparatus as one embodiment of the present invention. FIG. 2 is a view illustrating one embodiment of a method of separating or removing solder oxides using the soldering apparatus of FIG. 1. FIG. 3 is a perspective view of a main part of a solder outflowing device which is one component of the present soldering apparatus.

Referring to FIG. 1, symbol 1 indicates a solder outflowing nozzle, symbol 2 indicates a front baffle plate, symbol 3 indicates a rear baffle plate, symbol 4 indicates a perforated plate, symbol 5 indicates a solder bath, symbol 6 indicates a solder wave shape of molten solder, symbol 7 indicates solder oxides with solder adhered thereto, symbol 8 indicates a separating agent (for example, rice bran), symbol 9 indicates a vessel (for example, a netted basket), symbol 10 indicates a sifting container for accommodating and scattering the separating agent, symbol 11 indicates a partition plate, symbol 17 indicates solder oxides (oxidized draft), symbol 20 indicates a soldering apparatus, and symbol 30 indicates a printed wiring board. Referring to FIG. 3, symbol 12 indicates a pore, symbol 13 indicates a delivery pump, symbol 14 indicates an axis, symbol 15 indicates a duct for molten solder, symbol 16 indicates an opening, and symbol 21 indicates a solder outflowing device.

Referring to FIGS. 1 and 3, a solder wave shape 6 is formed by molten solder which is circulated by a solder outflowing device 21, and solders printed wiring boards 30 which are directed along the arrow in a given pattern.

The solder outflowing device 21 is located inside the solder bath. In the solder outflowing device 21, molten solder is drawn into the delivery pump 13 through the opening 16, and is discharged from the solder outflowing nozzle 1 via the duct 15 to form the desired solder wave shape with the front baffle plate 2 and the rear baffle plate 3.

The perforated plate 4 provided in the middle level of the solder outflowing nozzle 1 is perforated to define a plurality of holes arranged in multiple rows and columns at predetermined pitches for removing impurities, metal masses, lead wires and the like which have been mixed into molten solder. That is, the plate 4 plays a role as a filter.

Molten solder flowing down from the rear baffle plate 3 is circulated by the delivery pump 13. As a result, it contacts with air to form a large amount of solder oxides. The formed solder oxides move on the surface of molten solder toward the partition plate 11 shown in FIG. 1 and accumulate there.

The solder oxides receiving vessel 9 is disposed in the molten solder in the vicinity of the partition plate 11. The vessel 9 is composed of a mesh-like netted basket in which a diameter of the constituent wires of the net is approximately 0.5 mm and a side of a rectangular opening is approximately 1.2 mm. The vessel 9 may be lifted from a position (A) in the solder bath 5, stopped at a position (B), or turned over to a situation (C). Furthermore; the vessel may be stopped at an arbitrary position such as a position (D) shown in FIG. 2. The vessel 9 may be driven by a conventional and general mechanism such as a fluid cylinder and a pulse motor (not shown).

In addition, the sifting container 10 is provided above the vessel 9 outside the solder bath 5. The sifting container 10 accommodates a powdery separating agent such as rice bran and scatters the separating agent, by oscillating or agitating, through a meshed portion at its bottom onto solder oxides 7 which have been accumulated in the vicinity of the partition plate 11. Oscillating or agitating may be performed by utilizing an arbitrary and general means such as an. electromagnetic vibrator and a combination of an eccentric cam, a motor and a linkage.

A space for accumulating and receiving solder oxides (oxidized draft) 17 is also provided on the right side of the partition plate 11. (An exclusive container may be of course provided).

Next, a method of separating solder oxides floating on molten solder using the soldering apparatus having the above essential features is explained.

Separating Method 1

In the first step, solder oxides 7 floating on molten solder are scooped up by a netted basket (vessel 9), and then the netted basket is lifted so that about half of the vessel is out of the molten solder (see FIG. 2; the netted basket is at a position (D)).

In the second step, the sifting container 10 is agitated to dust (or scatter) the surface of solder oxides 7 with the accommodated separating agent 8 such as powdery rice bran. An amount of the separating agent to be scattered may be such that the surface of said solder oxides 7 is almost covered. For example, up to 0.7 spoonful of the separating agent may be scattered per 100 ml of solder oxides 7.

In the third step, the netted basket is moved up and down or from side to side so that solder oxides 7 are moved up and down from the molten solder surface. This operation is repeated several times.

In the fourth step, after confirming that the bulk of solder oxides is reduced and solder which has been adhered (or attached) to solder oxides is separated, the netted basket is pulled up from the molten solder surface (FIG. 1; position (B)).

In the fifth step, the netted basket is turned over to discard oxidized draff 17 into a waste receiving member and the like (FIG. 1; position (C)).

By the aforementioned steps 1–5, the procedure for removing solder oxides which have been floated and accumulated on molten solder is finished. The working time taken for the procedure is approximately 1 minute.

Furthermore, change in the order of, addition of a step or steps to, or deletion of a step or steps from the steps 1–5 may be optionally performed as follows:

Separating Method 2

The above second step, that is, a step for dusting solder oxides 7 floating on molten solder with the powdery separating agent 8 may be performed first. Thereafter, a step of scooping up solder oxides floating on molten solder into a vessel, a step of pulling the vessel out from the solder bath to separate solder and solder oxides, and a step of turning over the netted basket to discard oxidized draff 17 into a waste receiving member may be successively performed (not shown).

Separating Method 3

In accordance with another separating method, in the first step, solder oxides (solder dross) 7 floating on molten solder is scooped up and collected by the netted basket (vessel 9), and the netted basket is lifted to a given level above the molten solder surface (position (B) in FIG. 1). At this point, solder is adhered to solder oxides.

In the second step, the sifting container 10 is agitated to dust (or scatter) the surface of solder oxides 7 with the accommodated separating agent 8 such as rice bran. An amount of the separating agent to be scattered may be such that the surface of the solder oxides 7 is almost covered. For example, the amount of the separating agent is up to 0.7 spoonful per 100 ml of solder oxides 7.

In the third step, the netted basket is descended so that around half of the netted basket is immersed into molten solder (position (D) in FIG. 2). Thereafter, the netted basket is moved up and down or from side to side so that solder oxides 7 are moved up and down from the molten solder surface. This operation is repeated several times.

In the fourth step, after confirming that the bulk of solder oxides is reduced and solder which has been adhered (or attached) to the solder oxides is separated, the netted basket is pulled up from the molten solder surface (position (B) in FIG. 1).

In the fifth step, the netted basket is turned over to discard oxidized draff 17 into a waste receiving member and the like (position (C) in FIG. 1).

Furthermore, although the netted basket was used as a vessel for receiving solder oxides 7 in the preceding description of separating method 1, 2 or 3, the vessel is not limited to the netted basket, and any other optional members may be used. For example, a vessel may be formed of a punching metal which is perforated to define a plurality of circular or rectangular openings. In one embodiment, rectangular openings having an opening area of approximately 1–2.25 mm$^2$ are provided on an underside and on each sidewall of a receiving vessel in multiple rows and columns (matrix fashion) at pitches of approximately 1.5–2.0 mm.

Similarly, in the flow (wave)-type soldering apparatus, the solder outflowing nozzles may be provided at multiple sites, for example, at two sites. Moreover, instead of scooping up separated solder oxides (oxidized draft) 17 by a vessel such as the netted basket and the like, they may be scraped by a heat-resistant squeegee, for example, a plate made of stainless steel and the like. It is a matter of course that an inert gas may be used to force solder oxides to flow from the molten solder surface into the waste receiving member. In addition, the operation of for removing solder oxides may be controlled by time switch setting so that it is automatically performed in a regular interval, for example in every two hours (not shown in Figures).

Figure 4:
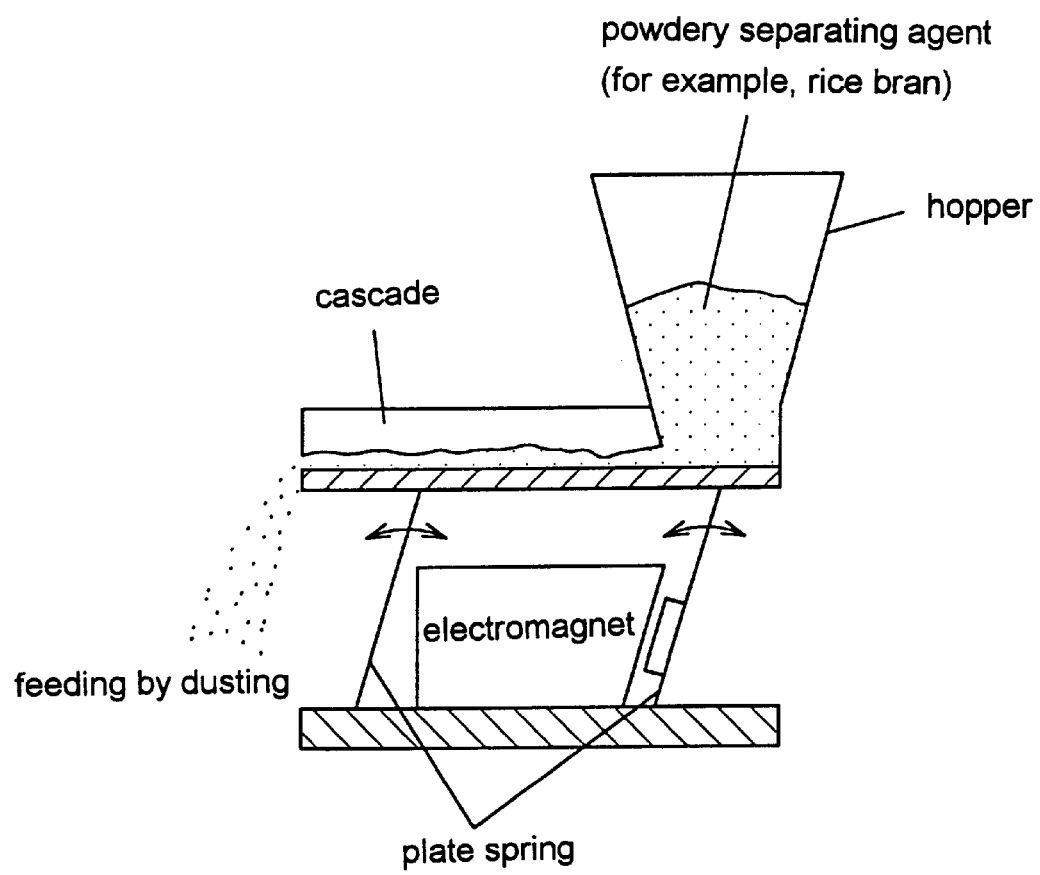
FIG. 4 is a side sectional view showing a main part of one embodiment of a separating agent dusting device which is one component of the soldering apparatus of FIG. 1.
Figure 5:
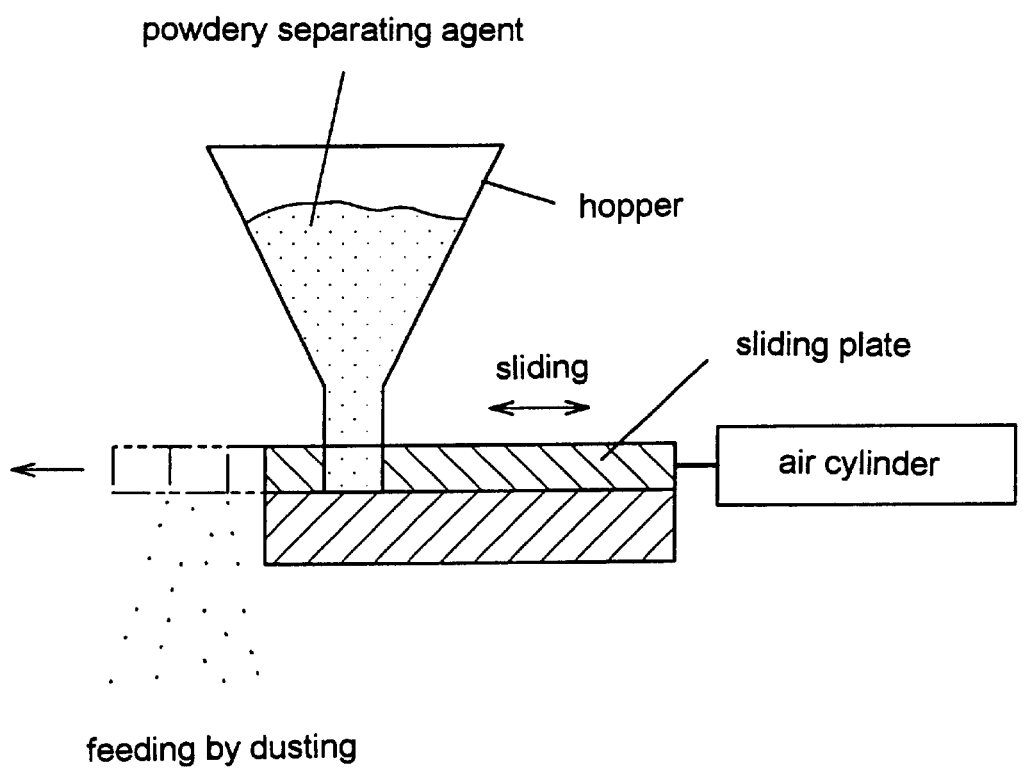
FIG. 5 is a side sectional view showing a main part of an another embodiment of a separating agent dusting device which is one component of the soldering apparatus of FIG. 1.
Figure 6:
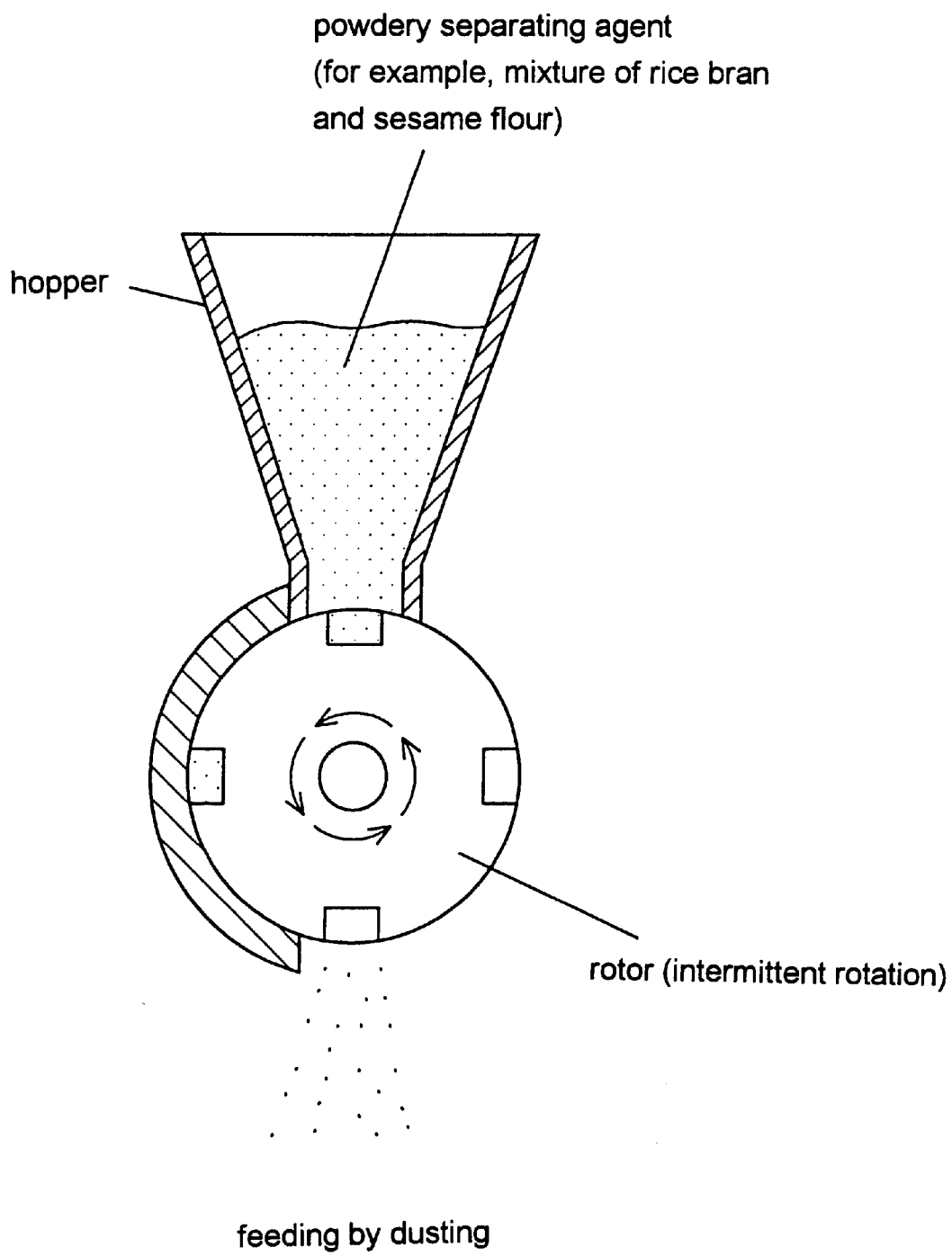
FIG. 6 is a side sectional view showing a main part of a still another embodiment of a separating agent dusting device which is one component of the soldering apparatus of FIG. 1.

Furthermore, the powdery separating agent dusting means may have any other structures as follows: the structure wherein a cascade (tub) and a hopper with a separating agent accommodated are electromagnetically vibrated as shown in FIG. 4, the structure wherein a lower part of a hopper with a separating agent accommodated is provided with a sliding plate having through holes arranged therein as shown in FIG. 5, and the structure wherein a lower part of a hopper with a separating agent accommodated is provided with a rotor having a plurality of notches arranged as shown in FIG. 6.

Furthermore, the aforementioned soldering apparatus may be utilized as a solder recovering apparatus for recovering solder from solder oxides with solder adhered thereto, in addition to being used as an apparatus for soldering various electronic parts carried on a printed wiring board. In this case, a method for recovering solder is to immerse solder oxides with solder adhered thereto into molten solder and separate and discharge only solder oxides by utilizing the reducing or anti-oxidizing activity of the aforementioned separating agent.

A method for recovering solder of the present invention comprises, for example, a step of placing solder oxides with solder adhered thereto into a vessel having a plurality of openings on an underside and a sidewall, a step of immersing the vessel having received solder oxides with solder adhered thereto into molten solder, a step of dusting solder oxides with solder adhered thereto with a separating agent, and a step of pulling out the vessel from molten solder. The separating agent is any one selected from the group consisting of offal, cereal grain or flour, bean flour, seed grain or flour, soybeancake flour, and peanut hull flour, or a combination thereof.

In addition, in a solder recovering apparatus, a stationery-type (dip-type) solder bath where solder wave shape is flat may be used instead of a flow-type (wave) solder bath.

Separating Method 4

Next, FIG. 7 is a view showing an embodiment of a method for separating solder and solder oxides.

Referring to FIG. 7, symbols 1–7 enclosed in parenthesis show each step of the separation procedure.

In the first step, a vessel 9 (netted basket, in which a diameter of the constituent wires of the net is approximately 0.5 mm and a side of a rectangular opening is approximately 1.2 mm) for receiving solder oxides with solder adhered thereto is immersed into a dip-solder bath or a flows-older bath (wave solder bath) to a depth of abut half its height. A temperature of molten solder is set at approximately 280–290° C (a flow-solder bath 5 is shown in FIG. 7).

In the second and third steps, a mass of solder oxides 7 with solder adhered thereto (solder oxides to which solder is attached/solder dross) is placed into the netted basket 9 in an amount of about half of its volume. A vessel for scooping up solder dross 7 may be an optional means such as a spoon, a nipper, a pincette and the like.

In the fourth step, the aforementioned separating agent 8 such as rice bran is scooped up with a spoon, and the surface of solder oxides with solder adhered thereto 7 is dusted (or scattered) therewith. An amount of the separating agent to be scattered may be such that the surface of the solder oxides 7 is almost covered. For example, an amount of the separating agent may be up to 0.7 spoonful per 100 ml of solder oxides 7.

In the fifth step, the netted basket 9 is moved up and down or from side to side so that solder oxides with solder adhered thereto 7 is pulled up and down from the molten solder surface 18. This operation is repeated several times.

In the sixth step, after confirming that the bulk of solder oxides with solder adhered thereto 7 is reduced and solder which has been adhered (or attached) to solder oxides is molten, the netted basket 9 is pulled out from the molten solder surface 18.

In the seventh step, oxidized draff (solder oxides) 17 which remains in the netted basket 9 is discarded into a waste receiving member and the like.

By the aforementioned steps 1–7, the procedure for separating solder and solder oxides is finished. The working time taken for the procedure is approximately one to two minutes. According to this procedure, above ninety percent of solder which has been adhered to solder oxides can be recovered and the bulk of solder oxides themselves can be reduced to approximately ten to twenty percent of the original bulk.

According to the method of the present invention, the separation of solder oxides and solder can be extremely easily performed in a short time and safely. The method of the present invention does not require wearing a protecting equipment upon handling the separating agent. In addition, since rice bran is used as a separating agent, the method of the present invention is performed at an extremely low cost. It is also useful for protection of the environment, since rice bran which has been handled as a waste in many cases can be effectively utilized.

In this method, the separating agent is not limited to rice bran. Separation of solder oxides can also be accomplished by using any one selected from the group consisting of offal (bran, wheat bran, mixed barley bran, naked barley bran, mixed naked barley bran and the like), bean flour (soybean, azuki bean, peanut, coconut and the like), soybean-cake flour, peanut hull flour and seed flour (sesame, sunflower, palm, rapeseed and the like) described above or a combination thereof In particular, seed flour exerts the better separating effect. An amount of the separating agents other than rice bran to be scattered is also similar to that of rice bran and is up to 0.7 spoonful per 100 ml of solder oxides.

Moreover, change of the order of, deletion of a step or steps from the steps 1–7 may be optionally performed.

For example, a step for placing solder oxides with solder adhered thereto into a vessel outside molten solder (outside the solder bath or above the molten solder surface) may be performed first. Thereafter, a step of dusting the solder oxides with solder adhered thereto with any one of the separating agents described above or a combination thereof, a step of immersing the vessel into the molten solder bath to melt solder oxides with solder adhered thereto, and a step of pulling out the vessel from the solder bath to separate solder and solder oxides may be successively performed.

In addition, a step of placing solder oxides, with solder adhered thereto into a vessel outside a molten solder, a step of immersing the vessel into the molten solder bath to melt solder oxides with solder adhered thereto, a step of dusting the solder oxides with solder adhered thereto with any one of the aforementioned separating agents or a combination thereof, and a step of pulling out the vessel from the solder bath to separate solder and solder oxides may be successively performed.

Separating Method 5

Next, a method for separating solder oxides floating on molten solder into solder and solder oxides (Separating method 5) is described as another embodiment of the present invention. The separating agent to be used in this case is the same as that in (Separating method 4) (such as rice bran). An amount of rice bran to be scattered to solder oxides is also similar to that in (Separating method 4). The order of the steps of separating solder and solder oxides is as follows:

In the first step, a receiving vessel for scooping solder oxides (a netted basket, in which the diameter of constituent wires of the net is approximately 0.5 mm and a side of a rectangular opening is approximately 1.2 mm) is immersed into a dip- or flow-solder bath to a degree that the upper edge of the vessel is hidden.

In the second step, solder oxides floating on molten solder (solder dross) is scooped up by the netted basket and collected, and then the netted basket is lifted so that half of its height is immersed.

In the third step, the separating agent such as rice bran according to the present invention is dusted (or scattered) onto the surface of the solder oxides floating on molten solder using a spoon. An amount of the separating agent to be scattered may be such that the surface of solder oxides is almost covered. For example, the amount may be up to 0.7 spoonful per 100 ml of solder oxides.

In the fourth step, the netted basket is moved up and down or from side to side so that the solder oxides are moved up and down from the molten solder surface. This operation is repeated several times.

In the fifth step, after confirming that the bulk of solder oxides is reduced and solder which has been adhered (attached) to solder oxides is melted, the netted basket is pulled out from the molten solder surface.

In the sixth step, oxidized draff(solder oxides) which remain in the netted basket is discharged into a waste receiving member and the like.

By the aforementioned steps 1–6, the procedure for separating solder and solder oxides is finished. The working time taken for the procedure is approximately one minute (not shown). According to this procedure (Separating method 5), the separation of solder and solder oxides can be extremely easily performed in a short time and at a low cost.

Furthermore, change in the order of, addition of a step or steps to, or deletion of a step or steps from the steps 1–6 may also be optionally performed.

For example, by changing the order of the third step, a step for dusting solder oxides floating on molten solder with any one of the aforementioned separating agents or a combination thereof may be performed first. Thereafter, a step of scooping up solder oxides floating on the molten solder into a vessel, and a step of pulling out the vessel from the solder bath to separate solder and solder oxides may be successively performed (not shown).

In the aforementioned two embodiments (Separating methods 4 and 5), the use of the netted basket is described as a vessel for receiving solder oxides with solder adhered thereto or solder oxides floating on molten solder. But the vessel is not limited to the netted basket, and any optional members can be used. For example, the vessel may be formed of a punching metal provided with a plurality of circular or rectangular openings. In one embodiment, the receiving vessel is formed such that a plurality of rectangular openings having an opening area of approximately 1–2.25 mm$^2$ are provided in multiple rows and columns (matrix fashion) at pitches of approximately 1.5–2.0 mm on an underside and each sidewall thereof In addition, instead of the flow (wave) type soldering apparatus, the stationery dip-type soldering apparatus may be used.

Furthermore, instead of scooping up separated solder oxides (oxidized draff) by the netted basket, the solder oxides may be scraped off with a heat-resistant plate or the like, or may be forced to flow off the molten solder surface with an inert gas or the like.

What is claimed is:

1. A soldering apparatus comprising:
    a solder wave shape forming device for melting solder and for forming a solder wave shape; and
    a separating agent dusting device for dusting solder oxides with a separating agent so as to separate solder from the solder oxides, said separating agent consisting of at least one of offal, cereal grain, cereal flour, bean flour, seed grain, seed flour, soybean-cake flour, and peanut hull flour.

2. The apparatus of claim 1, wherein said offal consists of at least one of rice bran, bran, wheat bran, mixed barley bran, naked barley bran, and mixed naked barley bran;
    wherein said cereal grain and cereal flour consist of at least one of foxtail, deccan grass, millet, and rice;
    wherein said bean flour consists of at least one of soybean, azuki bean, peanut, and coconut; and
    wherein said seed grain and said seed flour consist of at least one of sesame, sunflower, palm, rapeseed, and cotton.

3. The apparatus of claim 2, further comprising a solder oxide scooping device for scooping solder oxides floating on molten solder.

4. The apparatus of claim 3, wherein said solder oxide scooping device comprises a vessel having a discharge device for discharging the solder oxides scooped up by said vessel.

5. The apparatus of claim 4, wherein said vessel includes an underside having a plurality of openings and includes sidewalls having a plurality of openings, each of said openings having an area of 1.00 mm$^2$ to 2.25 mm$^2$.

6. The apparatus of claim 5, wherein said vessel is formed of a punching metal.

7. The apparatus of claim 5, wherein said vessel comprises a nettled basket having rectangular openings formed of wires having a diameter of 0.3 mm to 0.7 mm, each of said rectangular openings having sides of 1.0 mm to 1.5 mm.

8. The apparatus of claim 1, further comprising a solder oxide scooping device for scooping solder oxides floating on molten solder.

9. The apparatus of claim 8, wherein said solder oxide scooping device comprises a vessel having a discharge device for discharging the solder oxides scooped up by said vessel.

10. The apparatus of claim 9, wherein said vessel includes an underside having a plurality of openings and includes sidewalls having a plurality of openings, each of said openings having an area of 1.00 mm$^2$ to 2.25 mm$^2$.

11. The apparatus of claim 10, wherein said vessel is formed of a punching metal.

12. The apparatus of claim 10, wherein said vessel comprises a nettled basket having rectangular openings formed of wires having a diameter of 0.3 mm to 0.7 mm, each of said rectangular openings having sides of 1.0 mm to 1.5 mm.

13. A soldering apparatus comprising:
    a solder wave shape forming device for melting solder and for forming a solder wave shape;
    a separating agent dusting device for dusting solder oxides with a separating agent so as to separate solder from the solder oxides, said separating agent consisting of at least one of offal, cereal grain, cereal flour, bean flour, seed grain, seed flour, soybean-cake flour, and peanut hull flour; and
    a solder oxide scraper for scraping solder oxides floating on molten solder.

14. A soldering apparatus comprising:
    a solder wave shape forming device for melting solder and for forming a solder wave shape;
    a separating agent dusting device for dusting solder oxides with a separating agent so as to separate solder from the solder oxides, said separating agent consisting of at least one of offal, cereal grain, cereal flour, bean flour, seed grain, seed flour, soybean-cake flour, and peanut hull flour; and
    a solder oxide forcing device for forcing solder oxides floating on molten solder to flow using an inert gas.

15. A soldering apparatus comprising:
    a solder heating device for melting solder; and
    a separating agent dusting device for dusting solder oxides with a separating agent so as to separate solder from the solder oxides, said separating agent consisting of at least one of offal, cereal grain, cereal flour, bean flour, seed grain, seed flour, soybean-cake flour, and peanut hull flour.

16. The apparatus of claim 15, wherein said offal consists of at least one of rice bran, bran, wheat bran, mixed barley bran, naked barley bran, and mixed naked barley bran;
    wherein said cereal grain and cereal flour consist of at least one of foxtail, deccan grass, millet, and rice;
    wherein said bean flour consists of at least one of soybean, azuki bean, peanut, and coconut; and
    wherein said seed grain and said seed flour consist of at least one of sesame, sunflower, palm, rapeseed, and cotton.

17. The apparatus of claim 15, further comprising a solder oxide scooping device for scooping solder oxides floating on molten solder.

18. The apparatus of claim 17, wherein said solder oxide scooping device comprises a vessel having a discharge device for discharging the solder oxides scooped up by said vessel.

19. The apparatus of claim 18, wherein said vessel comprises a nettled basket having rectangular openings formed of wires having a diameter of 0.3 mm to 0.7 mm, each of said rectangular openings having sides of 1.0 mm to 1.5 mm.

20. A soldering apparatus comprising:
   a solder heating device for melting solder;
   a separating agent dusting device for dusting solder oxides with a separating agent so as to separate solder from the solder oxides, said separating agent consisting of at least one of offal, cereal grain, cereal flour, bean flour, seed grain, seed flour, soybean-cake flour, and peanut hull flour; and
   a solder oxide scraper for scraping solder oxides floating on molten solder.

21. A soldering apparatus comprising:
   a solder heating device for melting solder;
   a separating agent dusting device for dusting solder oxides with a separating agent so as to separate solder from the solder oxides, said separating agent consisting of at least one of offal, cereal grain, cereal flour, bean flour, seed grain, seed flour, soybean-cake flour, and peanut hull flour; and
   a solder oxide forcing device for forcing solder oxides floating on molten solder to flow using an inert gas.

22. A separating agent comprising:
   a cereal for separating solder from solder oxides adhered to the solder, and for separating solder from solder oxides in contact with molten solder.

23. The separating agent of claim 22, wherein said cereal consists of at least one of foxtail, deccan grass, millet, and rice.

24. The separating agent of claim 23, wherein said cereal comprises at least one of cereal grain and cereal flour.

25. The separating agent of claim 22, wherein said cereal comprises at least one of cereal grain and cereal flour.

26. A separating agent comprising:
   offal for separating solder from solder oxides adhered to the solder, and for separating solder from solder oxides in contact with molten solder.

27. The separating agent of claim 26, wherein said offal consists of at least one of rice bran, bran, wheat bran, mixed barley bran, naked barley bran, and mixed naked barley bran.

28. A separating agent comprising:
   bean flour for separating solder from solder oxides adhered to the solder, and for separating solder from solder oxides in contact with molten solder.

29. The separating agent of claim 28, wherein said bean flour consists of at least one of soybean, azuki bean, peanut, and coconut.

30. A separating agent comprising:
   soybean-cake flour for separating solder from solder oxides adhered to the solder, and for separating solder from solder oxides in contact with molten solder.

31. A separating agent comprising:
   peanut hull flour for separating solder from solder oxides adhered to the solder, and for separating solder from solder oxides in contact with molten solder.

32. A separating agent comprising:
   seed grain for separating solder from solder oxides adhered to the solder, and for separating solder from solder oxides in contact with molten solder.

33. The separating agent of claim 32, wherein said seed grain consists of at least one of sesame, sunflower, palm, rapeseed, and cotton.

34. A separating agent comprising:
   seed flour for separating solder from solder oxides adhered to the solder, and for separating solder from solder oxides in contact with molten solder.

35. The separating agent of claim 34, wherein said seed flour consists of at least one of sesame, sunflower, palm, rapeseed, and cotton.

36. A separating agent comprising:
   at least two of a group including cereal, offal, bean flour, soybean-cake flour, peanut hull flour, and seed flour seed flour for separating solder from solder oxides adhered to the solder, and for separating solder from solder oxides in contact with molten solder.

* * * * *